US010198317B1

(12) United States Patent
Sorenson, III et al.

(10) Patent No.: US 10,198,317 B1
(45) Date of Patent: Feb. 5, 2019

(54) COMPUTATION REFINEMENT IN A DATA STORAGE SYSTEM

(71) Applicant: Amazon Technologies, Inc., Reno, NV (US)

(72) Inventors: James Christopher Sorenson, III, Seattle, WA (US); Mark Robert Sieklucki, Seattle, WA (US); Rajesh Shanker Patel, Bellevue, WA (US); Dave Rahmany, Seattle, WA (US)

(73) Assignee: Amazon Technologies Inc., Reno, NV (US)

( * ) Notice: Subject to any disclaimer, the term of this patent is extended or adjusted under 35 U.S.C. 154(b) by 142 days.

(21) Appl. No.: 14/543,827

(22) Filed: Nov. 17, 2014

(51) Int. Cl.
*G06F 11/00* (2006.01)
*G06F 11/10* (2006.01)
*G06F 17/30* (2006.01)

(52) U.S. Cl.
CPC .... *G06F 11/1076* (2013.01); *G06F 17/30073* (2013.01)

(58) Field of Classification Search
CPC .. G06F 11/1076–11/1096; G06F 3/067; G06F 3/0683–3/0689
See application file for complete search history.

(56) References Cited

U.S. PATENT DOCUMENTS

| 7,403,658 | B2 | 7/2008 | Lin et al. | |
|---|---|---|---|---|
| 8,209,577 | B2 | 6/2012 | Huang et al. | |
| 8,296,515 | B1 * | 10/2012 | Saxena | G06F 11/1076 711/114 |
| 9,128,910 | B1 * | 9/2015 | Dayal | G06F 11/22 |
| 10,019,316 | B1 * | 7/2018 | Molina-Estolano | H04L 67/1097 |
| 2006/0218470 | A1 * | 9/2006 | Dickson | G06F 11/1076 714/767 |
| 2010/0037056 | A1 | 2/2010 | Follis et al. | |
| 2011/0078080 | A1 * | 3/2011 | Grube | G06F 11/1076 705/44 |
| 2012/0017140 | A1 * | 1/2012 | Wylie | G06F 11/1076 714/777 |

(Continued)

FOREIGN PATENT DOCUMENTS

WO    2011154750    12/2011

OTHER PUBLICATIONS

U.S. Appl. No. 14/133,575, filed Dec. 18, 2014, Bryan James Donlan.

(Continued)

*Primary Examiner* — Michael Maskulinski
(74) *Attorney, Agent, or Firm* — Robert C. Kowert; Meyertons, Hood, Kivlin, Kowert & Goetzel, P.C.

(57) ABSTRACT

A storage manager may be used to perform a refinement operation on a coding matrix as part of a coding operation (e.g., an encoding operation or a decoding operation) in a storage system, such as an object-redundant storage system. The refinement operation may include identifying a plurality of computations to be performed as part of the coding operation, where the plurality of computations have common terms and operations. The refinement operation may include refining a coding matrix associated with the coding operation based on the identified computations and precomputing the identified computations. The precomputed computations may be used instead of performing the computations when performing the coding operation.

22 Claims, 7 Drawing Sheets

(56) References Cited

U.S. PATENT DOCUMENTS

2012/0084507 A1* 4/2012 Colgrove ............ G06F 11/1076
 711/114
2015/0331744 A1* 11/2015 Slik .................... H04L 67/1095
 714/764
2017/0024141 A1* 1/2017 Davis ................. G06F 11/1008

OTHER PUBLICATIONS

"Optimizing Cauchy Reed-Solomon Codes for Fault-Tolerant Storage Applications", James S. Plank, Dec. 2005, pp. 1-11.
"Optimizing Cauchy Reed-Solomon Codes for Fault-Tolerant Network Storage Applications", James S. Plank, Lihao Xu, Jul. 2006, pp. 1-9.

* cited by examiner

COMPUTATION REFINEMENT IN A DATA STORAGE SYSTEM

BACKGROUND

Modern computing applications require storage of large amounts of data. Over time, the need to storage and retrieve large amounts of data continues to increase. Other common concerns are the ability to store data durably and efficiently. Durability typically refers to the ability to recover data in the event of a failure. Data durability typically requires some form of redundancy in how the data is stored. For example, data may be mirrored to two different storage devices such that an exact replica copy of the data is stored on both storage devices. If one of the storage devices fails, the data can still be retrieved from the other storage device. Some systems desire even stronger levels of durability that involve more complex redundancy encoding scheme that allow the data to still be retrieved even after multiple device failures. Techniques to provide data durability typically incur some amount of overhead, both in terms of the amount of additional storage required and computational overhead, and thus are at odds with the desire to be able to store and retrieve large amounts of data efficiently.

Web-based application, cloud computing, and other network and Internet based technologies are area frequently requiring storage of large amounts of data with needs for durability and efficiency. The conventional Web model allows clients to access Web resources (e.g., applications, services and data) via an HTTP client program, such as a Web browser. A technology referred to as Web services has been developed to provide programmatic access to Web resources. Web services may be used to provide programmatic access to Web resources including technology platforms (e.g., applications and services) and data (e.g., product catalogs and other databases) hosted on Web-connected computers such as Web server systems via a Web service interface. Generally speaking, a Web service interface may be configured to provide a standard, cross-platform API (Application Programming Interface) for communication between a client requesting some service to be performed and the service provider. In some implementations, a Web service interface may be configured to support the exchange of documents or messages including information describing the service request and response to that request. Such documents, or messages, may be exchanged using standardized Web protocols, such as the Hypertext Transfer Protocol (HTTP), for example, and may be formatted in a platform-independent data format, such as eXtensible Markup Language (XML), for example.

One example of a service that is provided to clients via a Web service interface is a data storage service. A typical data storage service (which may be referred to herein as an "object-redundant storage system") may receive requests to store data objects on behalf of storage service clients, and may store those data objects using redundancy in order to provide a high level of durability for the stored data. For example, such a data storage service may replicate the objects it stores across different storage nodes to increase the likelihood that object data will survive the failure of any given storage node. In such systems, until a certain minimum number of replicas (e.g., two or three) of an object have been successfully written the write operation may not be considered to be completed. However, for a given object, the actual number of valid replicas (or instances) of that object might at some points in time be less than the target number, for a variety of reasons, and a replacement process may be invoked to correct the situation. For example, if a previously valid replica becomes inaccessible due to a failure of the device on which it was stored, the failed device may be replaced in the system, and another instance of the replica may be written to the replacement device. In some systems, each replica need not correspond to an exact copy of the object data. For example, in some object-redundant storage systems, an object may be divided into a number of portions or "shards" according to a redundant encoding scheme (such as a parity, error correction code or other scheme), such that the object data may be recreated from fewer than all of the generated portions. Typically, object-redundant storage systems may be also seek to improve performance characteristics, such as latency, throughput or availability.

Figure 1:
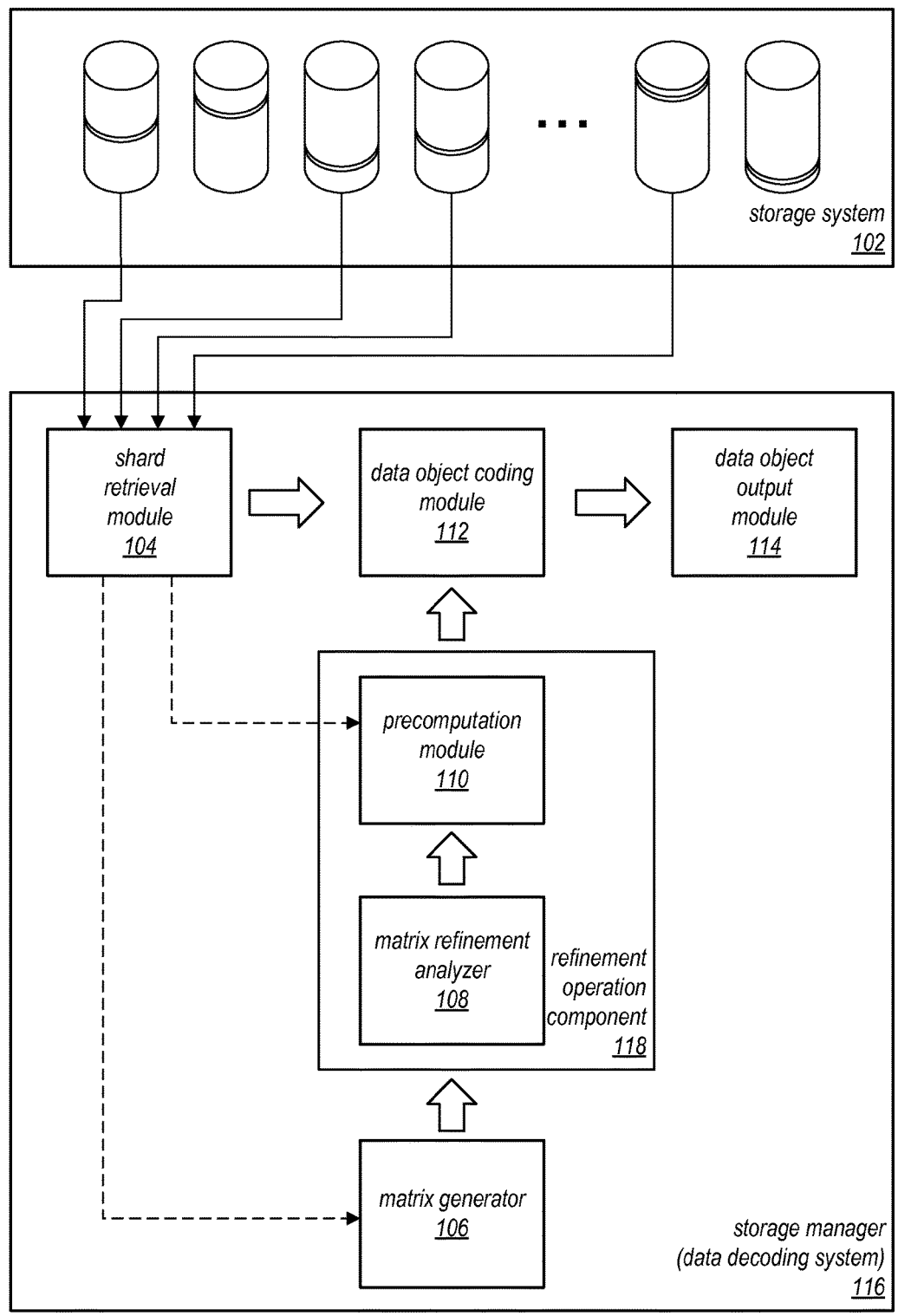
FIG. 1 is a high-level block diagram illustrating operations of an example system that decodes a coded data object.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

In some cases, storage service clients may be more concerned about data storage costs than they are about performance-related parameters such as latency, throughput or availability. For example, a client may be willing to trade away some or all of these performance constraints to achieve a more cost-effective storage solution for archival storage, where the data should be stored with some durability, and will be stored for a long time, but it is not going to be accessed very often (if at all). The systems and methods described herein may provide a storage service that is well suited for such storage models, and for other storage models in which the storage service does not store the only instances of the stored data. The storage services described herein as may in some embodiments provide very low cost storage with granular failure detection, and may be offered to storage service clients as a web-based service. These services may in some embodiments be used to build highly durable storage solutions on top of lower cost infrastructures (e.g., the storage systems described herein). Note that in the descriptions that follow, the terms "storage service" and "storage system" may be used somewhat interchangeably to refer to the functionality provided by a storage service or to an underlying computing system (and/or various components thereof) that is configured to implement that functionality.

In some embodiments, a storage manager of the storage systems described herein may receive a data object from a storage service client along with a request to store the data object. The storage manager may be configured to encode or encrypt the data object according to a redundant encoding technique such as erasure encoding. For example, the storage manager may encrypt the data object into a plurality of "shards" using an encoding matrix. Each shard may be stored on a different data storage device (e.g., to provide additional failure protection). At a future time, some or all of the shards may be used to reconstruct the original data object using a decoding matrix. The decoding matrix may be generated based on the encoding matrix.

As a non-limiting example, an erasure encoding scheme may be used in which additional data (e.g., redundant data) may be added to a data object to create an expanded data object. The expanded data object may be divided into n shards. However, in this example, only k shards are necessary to recreate the data object. As just one specific example, an erasure encoding scheme may be used in which 20 shards are generated for a data object (n=20), and 10 shards are required to recreate the data object (k=10). As another example, an erasure encoding scheme may be used in which 40 shards may be generated for a data object (n=40), with 10 shards required to recreate the data object (k=10). Note that, even if shards are lost from a storage system that implements the redundant encoding scheme, if at least k shards remain, generally no data is lost, as the remaining shards should include sufficient information to recreate the data object (e.g., the original data object).

As described in more detail herein, the processes of encoding and/or decoding the data object may be refined (e.g., by the storage manager of the storage system) to reduce an amount of computation performed to create an encoded data object and/or the reconstructed data object. In some embodiments, refining the processes of encoding may include analyzing the encoding matrix and/or the decoding matrix to identify computations having common terms and operations. In some embodiments, results of the identified computations may be precomputed to streamline the processes of encoding and/or decoding the data object by reducing repeated computations performed when encoding and/or decoding the data object.

As used herein, the term "common" refers to a set of matching terms and/or operations in different portions of a matrix. For example, in the matrix [0 1 1 1; 0 0 1 1] would include common terms 0, 1 and 1 in the first, third, and fourth positions of each row, respectively. In the example, the terms may include a common operation if the terms at the identified positions are indicated to be combined using the same combination method (e.g., if the terms are to be combined using an exclusive or (XOR) operator). Although this specification will discuss combining terms using simple logical operators such as XOR and AND, more complicated combinations are also contemplated. Additionally, a common operation may include using multiple different operators as long as corresponding positions are being combined using the same operators (e.g., the first and third positions are combined using a logical AND operation, and the result is combined with the fourth position using an XOR operation).

FIG. 1 is a high-level block diagram illustrating operations of an example system that decodes a coded data object. In this example, the system includes a storage system 102 configured to store a plurality of coded data objects and a storage manager 116 configured to decode the coded data objects. In particular, FIG. 1 illustrates a data decoding system of storage manager 116. In some embodiments, the storage system 102 is a distributed system including a plurality of storage devices, where multiple storage devices are configured to store different portions of a coded data object. In some embodiments, the storage manager 116 includes a shard retrieval module 104, a data object coding module 112, a data object output module 114, a refinement operation component 118, and a matrix generator 106. The refinement operation component 118 may include a precomputation module 110 and a matrix refinement analyzer 108.

As explained above, the storage system 102 may include a plurality of storage devices configured to store different portions of a coded data object. The coded data object may be coded according to an erasure coded technique or according to another coding technique. In some embodiments, each respective data object is stored as a respective plurality of shards. Each respective data object can be reconstructed from a particular number of shards. In some embodiments, the particular number of shards is fewer than a total number of shards for that data object. Each shard for a respective data object may be stored on a different one of the plurality of storage devices than any other shard of the plurality of shards for the respective data object. In some embodiments, the shards may be received at the storage system 102 from the storage manager 116. In other embodiments, the shards may be received at the storage system 102 from one or more other devices. In a particular embodiment, the storage system 102 is configured to, responsive to a request for the data object, provide the plurality of the shards for the respective data object to the storage manager 116. Although the examples provided herein may be particularly applicable to a network-based distributed storage system, in other embodiments, any form of distributed storage system may be used.

In some embodiments, the storage manager 116 may be used to generate a data object from a plurality of shards. Thus, in some embodiments, the storage manager 116 may be used to implement a data decoding system. As further described with reference to FIGS. 2 and 4, the storage manager 116 may also be configured to encode data objects for storage at the storage system 102. In a particular embodiment, the storage manager 116 may be implemented by one or more hardware processors. In this example, the storage manager 116 may operate as an interface between a client and the storage system 102. Accordingly, the storage manager 116 may receive a request from the client for a data object and may forward the request to the storage system 102. The storage manager 116 may receive, at the shard retrieval module 104, a plurality of shards from the storage system 102. In some embodiments, at least a subset of the plurality of shards may be decoded into the data object, where the subset includes at least the particular number of shards. As used herein, "a subset of the plurality of shards" may to refer to all shards of the plurality of shards or fewer than all shards of the plurality of shards. The storage manager 116 may be configured to reject one or more of the plurality of shards (e.g., because enough shards to reconstruct the data object have already been received). The storage manager 116 may also be configured to wait until a minimum number of shards needed to reconstruct the data object have been received. The storage manager 116 may also retrieve a matrix (e.g., an encoding matrix) corresponding to the data object. The matrix may be stored at the storage manager 116, stored at the storage system 102, stored by the client, or stored at another location. In some embodiments, the matrix is generated from an encoding matrix (e.g., an erasure coding matrix) used to encode the data object (e.g., as part of an erasure encoding process). The matrix may be provided to the matrix generator 106. In some embodiments, the subset of shards may also be provided to the matrix generator 106. In other embodiments, information representative of which shards were received may be sent to the matrix generator 106.

In some embodiments, the matrix generator 106 may be configured to generate a decoding matrix for decoding the subset of the plurality of shards into a data object. The decoding matrix may include portions of the encoding matrix which match the received shards. In some embodiments, the matrix generator 106 may also invert the matrix to generate the decoding matrix. Inverting the matrix may order the decoding matrix such that the data object may be correctly generated using the decoding matrix and the subset of the plurality of shards. In some embodiments, the decoding matrix may be representative of a plurality of computations to be performed when decoding the plurality of shards into the data object. The matrix generator 106 may be configured to provide the decoding matrix to the refinement operation component 118. As an example, the matrix generator 106 may receive an eight-by-six encoding matrix and six six-bit shards. In the example, eight shards may have been originally generated and provided to the plurality of data storage devices at the storage system 102. The matrix generator 106 may select six rows of the matrix which correspond to each of the six shards and invert the matrix to generate an ordered six-by-six decoding matrix. The matrix generator 106 may provide the ordered decoding matrix to the refinement operation component 118. In other embodiments, as discussed further with reference to FIGS. 2 and 4, the matrix generator 106 may also be used to generate an encode matrix for encoding a data object into a an encoded data object.

In some embodiments, the refinement operation component 118 may be configured to perform a refinement operation on the decoding matrix. In some embodiments, as further described with respect to FIG. 2, the refinement operation includes generating a list of indices based on the decoding matrix. The list of indices may correspond to computations to be performed using the decoding matrix. For example, each row of the list of indices may correspond to a row of the decoding matrix and includes one or more index values that indicate how data terms from the subset of the plurality of shards are to be combined to reconstruct the requested data object.

In some embodiments, to perform the refinement operation, the matrix refinement analyzer 108 is configured to parse the decoding matrix to identify computations to be performed when decoding the data object that include common terms and operations according to the decoding matrix. In some embodiments, the computations to be performed are identified according to a greedy algorithm. In a particular embodiment, the matrix refinement analyzer 108 continues to identify computations that include common terms and operations until a specified number (e.g., a number provided by a manager of the storage manager) of computations have been identified. In another embodiment, the matrix refinement analyzer 108 continues to identify computations until a predetermined amount of time expires. In a different embodiment, the matrix refinement analyzer 108 continues to identify computations until the matrix refinement analyzer 108 has determined that all computations having at least a particular complexity (e.g., a particular number of common terms) have been identified. The matrix refinement analyzer 108 may also configured to receive a complexity indicator that specifies a minimum number of terms (e.g., 3 terms) for each of the identified computations to have in common. In some embodiments, the matrix refinement analyzer 108 may dynamically determine conditions for identifying the computations based on matrix-specific information, such as the size of the decoding matrix. For example, the matrix refinement analyzer 108 may be configured to detect common terms for a longer amount of time or may be configured to look for more computations when presented with a larger matrix. In other embodiments, the matrix refinement analyzer 108 can generate an optimal set of identified computations. In a particular embodiment, the matrix refinement analyzer 108 determines whether to generate the optimal set of identified computations based on a predicted number of times corresponding precomputed results will be used. Accordingly, the matrix refinement analyzer 108 may identify a set of common terms and operations within two or more rows of the decoding matrix.

The matrix refinement analyzer 108 may further refine the decoding matrix such that the decoding matrix identifies the computations which correspond to precomputed results. For example, when the list of indices is generated, the matrix refinement analyzer 108 may replace each occurrence of identified repeated index values from each identified set of indices with a corresponding new index value. In some embodiments, the refinement process may be iterative (e.g., new index values may be replaced with different new index values). The matrix refinement analyzer 108 may indicate the identified rows to the precomputation module 110 (e.g., by updating the list of indices to indicate the identified computations). In other embodiments, the matrix refinement analyzer indicates the identified rows to the data object coding module 112 (e.g., because the storage manager 116 does not include a precomputation module 110).

In some embodiments, the precomputation module 110 is configured to precompute results of the identified computations. For example, the decoding matrix may be a matrix of data values to be multiplied by each shard. The resulting values may be XORed together to generate a portion of the data object. The precomputation module 110 may receive an indication of the identified rows from the matrix refinement analyzer 108. The precomputation module 110 may precompute results of combining the identified portions of the decoding matrix with one or more of the shards (e.g., with each of the shards used to generate the decoding matrix). The precomputation module 110 may also further refine the decoding matrix such that the decoding matrix indicates that the results of the identified computations have been precomputed (e.g., by replacing the common terms with one or more new terms). For example, when an identified computation is precomputed, the precomputation module 110 may replace each occurrence of repeated index values of the identified computation with a resulting value. In some embodiments, the decoding matrix is refined using new index values to replace repeated index values before the identified computations are precomputed. In such embodiments, the new index values are replaced with the corresponding resulting values. In some embodiments, the refinement process is iterative in nature. In those embodiments, the precomputation module 110 may provide the refined decoding matrix to the matrix refinement analyzer 108 to detect additional common terms and operations. The identified common terms and operations may include previously detected common terms and operations (e.g., a new index value may represent a different new index value or results of a precomputed resulting value). Upon determining that matrix refinement is complete, the refinement operation component 118 may provide the refined decoding matrix to the data object coding module 112. In some embodiments, the refinement operation component 118 may also provide the results of the precomputation to the data object coding module 112. In other embodiments, the refinement operation component 118 may indicate to the data object coding module 112 that the identified computations should be precomputed.

In some embodiments, the data object coding module 112 is configured to reconstruct the data object from the shards and the refined decoding matrix. In other embodiments, as described further with respect to FIGS. 2 and 4, the data object coding module 112 is additionally or alternatively configured to generate encoded data objects using a refined encoding matrix and a data object matrix. The data object coding module 112 may be configured to perform one or more operations as identified by the decoding matrix using the subset of the shards. For example, the data object coding module 112 may be configured to perform a matrix multiplication between the decoding matrix and a matrix formed from the shards. Further, the data object coding module 112 may be configured to perform one or more additional operations on the resulting matrix, such as XORing the resulting rows together to form the data object. The data object coding module 112 may be configured to use precomputed results instead of performing corresponding computations while reconstructing the data object. The data object coding module 112 may be configured to provide the reconstructed data object to the data object output module 114. The data object output module 114 may be configured to provide the reconstructed data object to the client.

Figure 2:
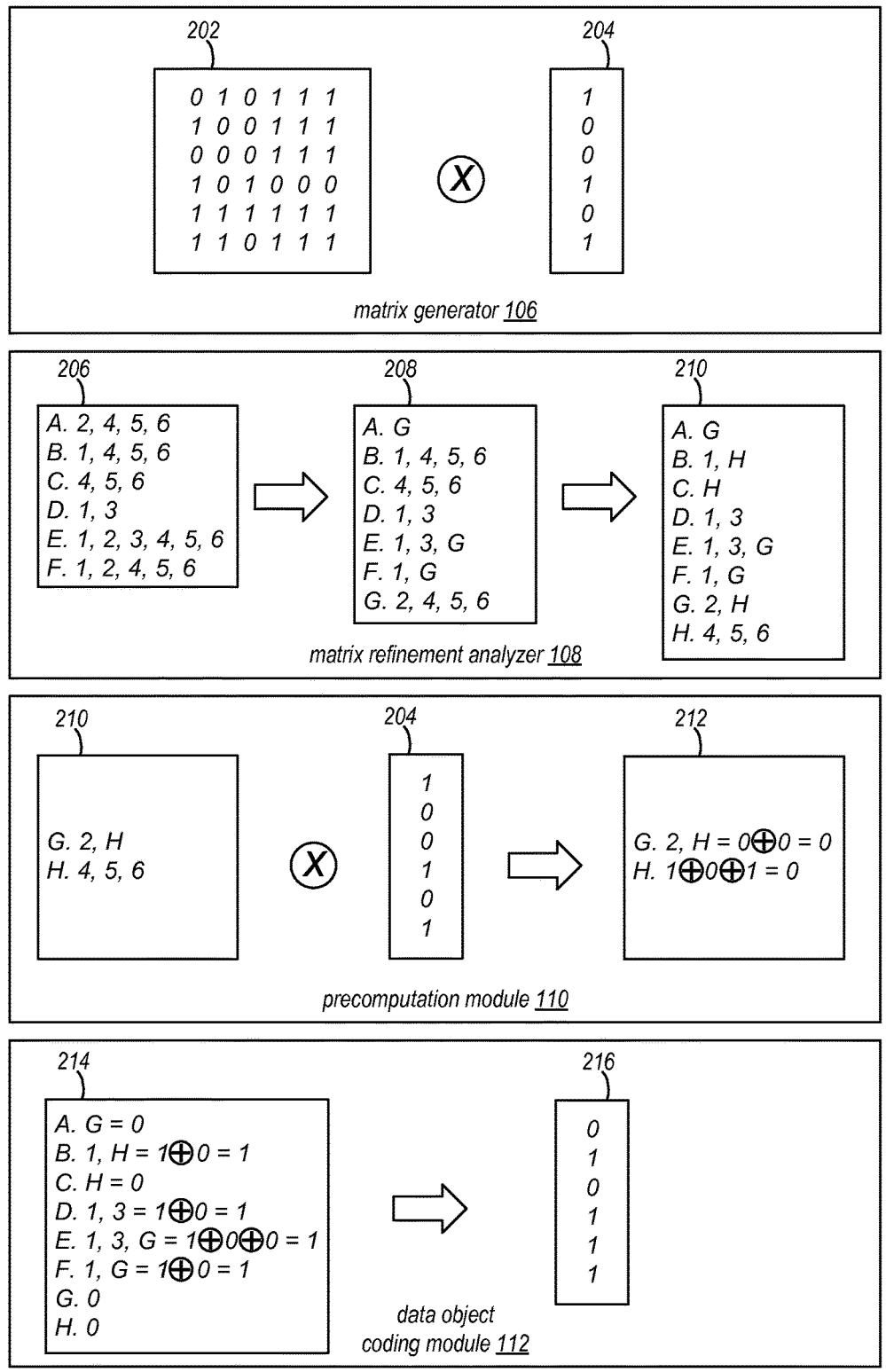
FIG. 2 illustrates an example of a coding operation implemented by a storage manager, according to at least some embodiments.

FIG. 2 illustrates an example of a coding operation implemented by a storage manager, according to at least some embodiments. With reference to FIG. 2, an illustrative encoding operation and an illustrative decoding operation will be described. In a particular embodiment, the coding operation is performed by the storage manager 116 of FIG. 1. In this example, for clarity purposes, only the matrix generator 106, the matrix refinement analyzer 108, the precomputation module 110, and the data object coding module 112 are illustrated. Although FIG. 2 is described in terms of one-bit index values, larger index values (e.g., 8-bit index values) may additionally or alternatively be used. The data values shown in FIG. 2 are for illustrative purposes only and may not necessarily correspond to a particular set of data values.

In some embodiments, as part of an encoding operation, in response to a request to store a data object, the matrix generator 106 may retrieve a coding matrix 202 and object data 204. In one embodiment, retrieving the coding matrix 202 and the object data 204 includes receiving the object data 204 from a client and generating the coding matrix 202 based on the object data 204. The coding matrix 202 may correspond to an encoding matrix and the object data 204 may correspond to at least a portion of a data object (e.g., a column of a data object). Although the coding matrix 202 is illustrated as a six-by-six square matrix, in other embodiments, larger matrices and non-square matrices (e.g., an eight-by-six matrix) may be used. The matrix generator 106 may provide the coding matrix 202 to the matrix refinement analyzer 108 and the object data 204 to the precomputation module 110 and to the data object coding module 112.

In some embodiments, as part of the encoding operation, the matrix refinement analyzer 108 is configured to generate a list of indices based on a received encoding matrix and to refine the list of indices. In the illustrated embodiment, the matrix refinement analyzer 108 receives the coding matrix 202 (e.g., an encoding matrix) and generates a list of indices 206 based on the coding matrix 202. In the illustrated embodiment, index values of the list of indices 206 are indicative of the logical "1" values of the coding matrix (e.g., are indicative of which portions of the object data 204 should be combined to generate an encoded object data object). In some embodiments, each row of the list of indices 206 corresponds to a row of the coding matrix 202. For example, in the illustrated embodiment, the row A of the list of indices 206 includes the index values 2, 4, 5, and 6, indicating that the first row of the coding matrix 202 includes a logical "1" value at positions 2, 4, 5, and 6. In the illustrated embodiment, the matrix refinement analyzer 108 iteratively refines the list of indices 206 by identifying a particular set of indices having index values that are repeated in different rows of the list of indices 206 (e.g., via parsing the list of indices 206). The matrix refinement analyzer 108 may also refine the list of indices 206 by replacing each occurrence of the repeated particular set of indices with a respective new index value. Further, the matrix refinement analyzer 108 may generate a new row in the list of indices 206 that indices that each new index value represents the repeated index values of the identified particular set of indices.

As an illustrative example, the matrix refinement analyzer 108 may identify that the index values 2, 4, 5, and 6 are recited in rows A, E, and F of the list of indices 206. The matrix refinement analyzer 108 may refine the list of indices 206 to generate a refined list of indices 208 by replacing the index values 2, 4, 5, 6 in rows A, E, and F with the index value G and by generating the row G which recites the index values 2, 4, 5, and 6. In the illustrative example, when computing values using rows A, E, or F, a computation device (e.g., the data object coding module 112) may refer to a precomputed result of row G and then perform additional computations as needed. In the illustrative example, the refinement operation is iterative. Accordingly, the matrix refinement analyzer 108 may identify additional repeated indices and generate another refined list based on the additional repeated indices. In the illustrative example, the matrix refinement analyzer may identify that the index values 4, 5, and 6 are recited in rows B, C, and G of the refined list of indices 208. The matrix refinement analyzer 108 may further refine the refined list of indices 208 to generate a different refined list of indices 210 by replacing the index values 4, 5, and 6 in rows B, C, and G with the index value H and by generating the row H which recites the index values 4, 5, and 6. Accordingly, in the illustrative example, the row G, which was added as part of the refinement process, refers to the row H. In the illustrated embodiment, the matrix refinement analyzer 108 may decide to stop refining the different refined list of indices 210 after generating the row H. In other embodiments, the matrix refinement analyzer 108 continues to identify additional repeated indices, such as the index values 1 and 3 in rows D and E. The different refined list of indices 210 may be passed to the precomputation module 110 for precomputation.

In some embodiments, the precomputation module 110 is configured to precompute computations identified by the matrix refinement analyzer 108. For example, the precomputation module may receive the different refined list of indices 210 (only rows G and H are shown for clarity purposes) and may generate precomputed results 212 of the identified computations using the object data 204. In the illustrated example, precomputation is performed using subsequently generated rows prior to previously generated rows. Thus, a result of row H may be precomputed prior to a result of row H. In the illustrated example, when row H (corresponding to the values 000111) is multiplied with the object data 204, the value 000101 results. In the illustrated example, the terms of the resulting value (000101) are combined using an XOR operation, resulting in the data value "0." As illustrated in FIG. 2, in some embodiments, this computation can be simplified by performing an XOR operation on the portions of the object data 204 corresponding to each index value. Thus, in the illustrated example, because row H recites the index values 4, 5, and 6, the precomputed results may be calculated by performing an XOR operation on bits 4, 5, and 6 of the object data (101), resulting in the data value "0." In the illustrated example, the data value of H ("0") is substituted into row G, and an XOR operation is performed between the "0" and the value of the object data corresponding to index value 2, ("0"), resulting in the data value "0." In some embodiments, the different refined list of indices 210 is modified to include the precomputed results 212. The combination process is described for illustrative purposes, and does not necessarily correspond to a particular coding process. In other embodiments, the terms may be combined in other ways (e.g., by using logical AND operations). The precomputation module 110 may pass the precomputed results 212 to the data object coding module 112.

In some embodiments, the data object coding module 112 is configured to generate resulting object data 216 from a precomputed list 214 that corresponds to the precomputed results 212 being substituted into the different refined list of indices 210. In the illustrated embodiment, the computations performed by the data object coding module 112 are similar to those performed by the precomputation module 110, except the data object coding module 112. Thus, in the illustrated example, the precomputed results of G and H are substituted into rows A, E, and F and B and C, respectively. Values of resulting object data 216 (e.g., an encoded data object) may be computed using the values of the precomputed list 214 (e.g., after the precomputed results have been substituted into the precomputed list 214, replacing the identified repeated computations) and the object data 204. Accordingly, in the illustrated embodiment, the data object coding module 112 uses the precomputed results instead of performing the identified computations while constructing the resulting object data 216. In some embodiments, when a row, such as row D of the precomputed list 214, does not include any precomputed values, the corresponding value of the resulting object data 216 is computed normally. The resulting object data 216 may be separated into a set of shards and provided to a storage system, such as the storage system 102 of FIG. 1. In one embodiment, each shard is set to a respective storage device of the storage system 102.

As mentioned previously, the coding operation of FIG. 2 can be applied to a decoding operation. Although FIG. 2 has been described in terms of encoding, one of ordinary skill can also see how the process illustrated in FIG. 2 can be used to refine a decoding operation. For example, in some embodiments, the coding matrix 202 may correspond to a decoding matrix. In some embodiments, the coding matrix 202 may be determined from an encoding matrix based on a set of received shards, as described above with reference to FIG. 1. In a particular embodiment, the object data 204 includes data from one or more received shards. In some embodiments, the matrix refinement analyzer 108, the precomputation module 110, and the data object coding module 112 operate on the coding matrix 202 and the object data 204 in a way similar to that described above with reference to an encoding process. In the particular embodiment, the resulting object data 216 corresponds to a reconstructed data object (e.g., a decoded data object). The reconstructed data object may be provided to a client.

In a particular embodiment, the coding operation of FIG. 2 may be performed during both encoding and decoding of a data object. Accordingly, in the particular embodiment, the coding matrix 202 may be used to encode the data object and portions of the coding matrix 202 (e.g., corresponding to a plurality of received shards) may be used to subsequently decode the data object. The refinement operation (e.g., corresponding to steps performed by the matrix generator 106, the matrix refinement analyzer 108, the precomputation module 110, the data object coding module 112, or any combination thereof) may be performed during the encode process and again during the decode process.

Figure 3:
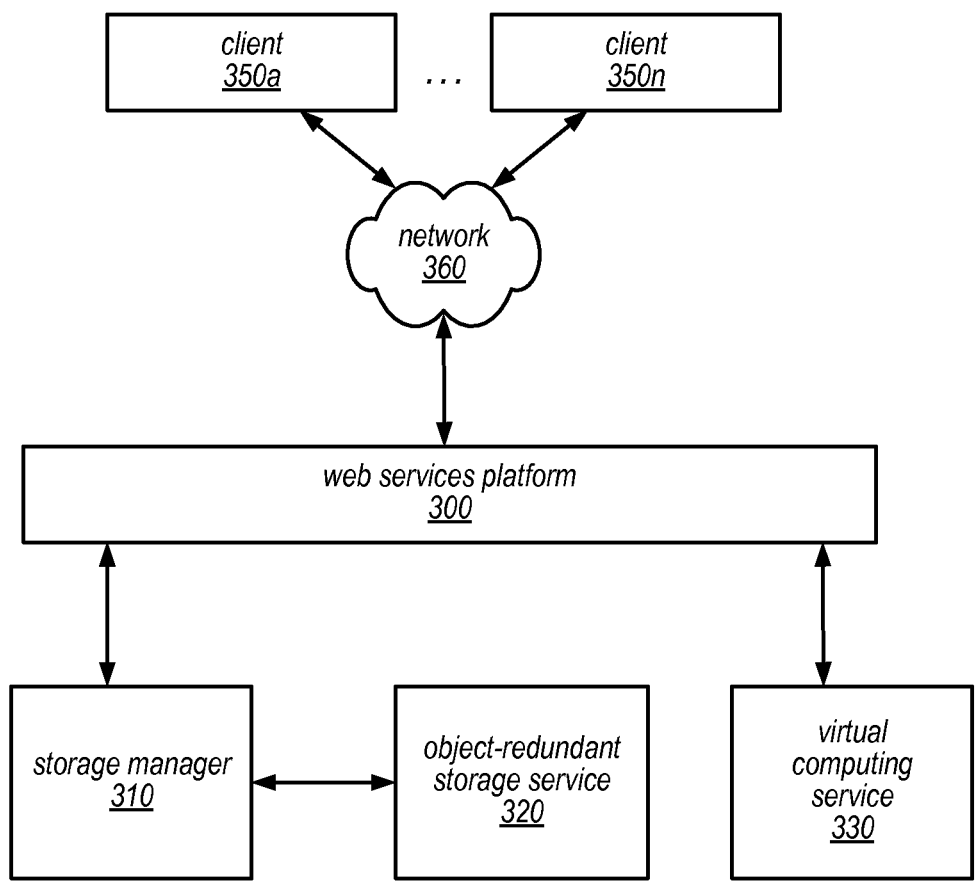
FIG. 3 is a block diagram illustrating a service system architecture that may be configured to implement an object-redundant storage service using a storage manager, according to some embodiments.

One embodiment of a service system architecture that may be configured to implement a web services-based storage service including the system described by FIG. 1 is shown in FIG. 3. In the illustrated embodiment, a number of clients (shown as clients 350a-350n) may be configured to interact with a web services platform 300 via a network 360. The web services platform 300 may be configured to interface with one or more instances of a storage manager 310 and/or a virtual computing service 330. The storage manager 310 may be configured to interface with an object-redundant storage service 320. In some embodiments, the storage manager 310 corresponds to the storage manager 116 of FIG. 1 and the object-redundant storage service 320 includes the storage system 102 of FIG. 1. It is noted that where one or more instances of a given component may exist, reference to that component herein may be made in either the singular or the plural. However, usage of either form is not intended to preclude the other.

In various embodiments, the components illustrated in FIG. 3 may be implemented directly within computer hardware, as instructions directly or indirectly executable by computer hardware (e.g., a microprocessor, a computer system, or one or more hardware processors), or using a combination of these techniques. For example, the components of FIG. 3 may be implemented by a distributed system including a number of computing nodes (or simply, nodes), such as the computer system embodiment shown in FIG. 7 and discussed below. In various embodiments, the functionality of a given service system component (e.g., a storage service system component) may be implemented by a particular node or distributed across several nodes. In some embodiments, a given node may implement the functionality of more than one service system component (e.g., more than one storage service system component).

Generally speaking, the clients 350a-n may encompass any type of client configurable to submit web services requests to the web services platform 300 via the network 360, including requests for storage services. For example, a given client 350a may include a suitable version of a web browser, or a plugin module or other type of code module configured to execute as an extension to or within an execution environment provided by a web browser. Alternatively, a client 350 (e.g., a storage service client) may encompass an application such as a database application, media application, office application or any other application that may make use of persistent storage resources. In some embodiments, such an application may include sufficient protocol support (e.g., for a suitable version of Hypertext Transfer Protocol (HTTP)) for generating and processing web services requests without necessarily implementing full browser support for all types of web-based data. That is, the client 350 may be an application configured to interact directly with the web services platform 300. As described herein, the client 350 may be configured to generate web services requests according to a Representational State Transfer (REST)-style web services architecture, a document- or message-based web services architecture, or another suitable web services architecture.

In other embodiments, a client 350 (e.g., a storage service client) may be configured to provide access to web services-based storage to other applications in a manner that is transparent to those applications. For example, the client 350 may be configured to integrate with an operating system or file system to provide storage in accordance with a suitable variant of the storage model described herein. However, the operating system or file system may present a different storage interface to applications, such as a conventional file system hierarchy of files, directories and/or folders. In such an embodiment, applications may not need to be modified to make use of the storage system service model of FIG. 1. Instead, the details of interfacing to the web services platform 300 may be coordinated by the client 350 and the operating system or file system on behalf of applications executing within the operating system environment.

The clients 350a-n may convey web services requests to and receive responses from the web services platform 300 via the network 360. In various embodiments, the network 360 may encompass any suitable combination of networking hardware and protocols necessary to establish web-based communications between the clients 350a-n and the web services platform 300. For example, the network 360 may generally encompass the various telecommunications networks and service providers that collectively implement the Internet. The network 360 may also include private networks such as local area networks (LANs) or wide area networks (WANs) as well as public or private wireless networks. For example, both a given client 350a and the web services platform 300 may be respectively provisioned within enterprises having their own internal networks. In such an embodiment, the network 360 may include the hardware (e.g., modems, routers, switches, load balancers, proxy servers, etc.) and software (e.g., protocol stacks, accounting software, firewall/security software, etc.) necessary to establish a networking link between given client 350a and the Internet as well as between the Internet and the web services platform 300. It is noted that in some embodiments, the clients 350a-n may communicate with the web services platform 300 using a private network rather than the public Internet. For example, the clients 350a-n may be provisioned within the same enterprise as a storage service system (e.g., a system that implements the storage manager 310). In such a case, the clients 350a-n may communicate with the web services platform 300 entirely through a private network (e.g., a LAN or WAN that may use Internet-based communication protocols but which is not publicly accessible).

Generally speaking, the web services platform 300 may be configured to implement one or more service endpoints configured to receive and process web services requests, such as requests to encode data objects or requests to decode data objects. For example, the web services platform 300 may include hardware and/or software configured to implement a particular endpoint, such that an HTTP-based web services request directed to that endpoint is properly received and processed. In one embodiment, the web services platform 300 may be implemented as a server system configured to receive web services requests from the clients 350a-n and to forward them to components of a storage manager 310 to provide an object-redundant storage service 320. Alternatively, the web services requests may be forwarded to another virtual computing service 330 for processing. In other embodiments, the web services platform 300 may be configured as a number of distinct systems (e.g., in a cluster topology) implementing load balancing and other request management features configured to dynamically manage large-scale web services request processing loads. In various embodiments, the web services platform 300 may be configured to support REST-style or document-based (e.g., SOAP-based) types of web services requests.

In addition to functioning as an addressable endpoint for clients' web services requests, in some embodiments, the web services platform 300 may implement various client management features. For example, web services platform 300 may coordinate the metering and accounting of client usage of web services, including storage resources, such as by tracking the identities of requesting clients 350a-n, the number and/or frequency of client requests, the size of objects stored or retrieved on behalf of clients 350a-n, overall storage bandwidth used by clients 350a-n, class of storage requested by clients 350a-n, or any other measurable client usage parameter. The web services platform 300 may also implement financial accounting and billing systems, or may maintain a database of usage data that may be queried and processed by external systems for reporting and billing of client usage activity. In certain embodiments, the web services platform 300 may be configured to collect, monitor and/or aggregate a variety of storage service system operational metrics, such as metrics reflecting the rates and types of requests received from the clients 350a-n, bandwidth utilized by such requests, system processing latency for such requests, system component utilization (e.g., network bandwidth and/or storage utilization within the storage service system), rates and types of errors resulting from requests, characteristics of requested objects (e.g., size, data type, etc.), or any other suitable metrics. In some embodiments such metrics may be used by system administrators to tune and maintain system components, while in other embodiments such metrics (or relevant portions of such metrics) may be exposed to the clients 350a-n to enable such clients to monitor their usage of the object-redundant storage service 320 (e.g., via the storage manager 310) and/or another virtual computing service 330 (or the underlying systems that implement those services).

In some embodiments, the web services platform 300 may also implement user authentication and access control procedures. For example, for a given web services request to access a particular data object (e.g., an encoded/encrypted data object) stored at the object-redundant storage service 320, the web services platform 300 may be configured to ascertain whether the client 350 associated with the request is authorized to access the particular data object. The web services platform 300 may determine such authorization by, for example, evaluating an identity, password or other credential against credentials associated with the particular data object, or evaluating the requested access to the particular data object against an access control list for the particular data object. For example, if a client 350 does not have sufficient credentials to retrieve the particular object, web services platform 300 may reject the corresponding web services request, for example by returning a response to the requesting client 350 indicating an error condition. Various access control policies may be stored as records or lists of access control information by the storage manager 310, the object-redundant storage service 320 and/or the other virtual computing services 330.

While in some embodiments, a storage service system that implements an object-redundant storage service may support data objects of arbitrary sizes, in other embodiments, data objects may be constrained to a certain maximum size, also referred to as a chunk size. In some such embodiments, when a client 350 provides an object to be stored by the object-redundant storage service 320, and the object exceeds the chunk size, the web services platform 300 may be configured to divide the object into two or more chunks according to the chunk size. In one embodiment, the web services platform 300 may be configured to store each chunk as a respective data object that is encoded and decoded separately. In other words, the storage manager 310 may separately encode and decode each chunk. In other embodiments, when a client provides an object to be stored by the object-redundant storage service 320 and the object exceeds the chunk size, the web services platform 300 may be configured to return a response to the requesting client 350 indicating an error condition.

It is also noted that while the web services platform 300 may represent the primary interface through which clients 350a-n may access the features of a storage system that implements the object-redundant storage service 320 via the storage manager 310, the web services platform 300 need not represent the sole interface to such features. For example, an alternate API that may be distinct from a web services interface may be used to allow clients internal to the enterprise providing the storage service system to bypass the web services platform 300. In another example, a virtual computing service 330 may configured to bypass the web services platform 300 and to implement an API directly between the virtual computing service 330 and a the storage manager 310 to store objects used in performing the virtual computing service 330 on behalf of a client 350. In some cases, the accounting and/or credentialing services of the web services platform 300 may be unnecessary for internal clients such as administrative clients or between service components within the same enterprise.

Note that while several examples included herein describe computation refinement in an object-redundant storage service as a Web-based service exposed to storage service clients, in other embodiments, the object-redundant storage service may be internal to a computing system or an enterprise system and may not be exposed to external clients (e.g., users or client applications). For example, a client may store objects to a primary storage service (a storage service other than an object-redundant storage service), and the primary storage service or an operating system (or another system component) may cause the object (or a replica or shard thereof) to be stored to an object-redundant storage service instead of or in addition to storing the object to the primary storage service. In another example, the operating system, a backup process, or another system component may back up a primary storage system (e.g., periodically, automatically or in response to a request to do so) to an object-redundant storage system. In these examples, the "client" of the object-redundant storage service 320 may be another application internal to a web services platform (such as the virtual computing service 330 illustrated in FIG. 3). In such embodiments, the client may access the storage manager 310 of the object-redundant storage service 320 over a local or private network, rather than over the Internet.

As described above, in one example of a storage service, a client may upload a data object from a client network for storage in a plurality of data storage devices of a storage system. The data object may be encoded prior to storage in the plurality of data storage devices. The encoding process may be refined according to a refinement process. One embodiment of a method for encoding a data object for storage in a storage service is illustrated by the flow diagram of FIG. 4. As illustrated at 400, in this example, the method may include a storage service receiving a data object and a request to store the data object. In some embodiments, the request may be received at a storage manager such as the storage manager 116 illustrated in FIG. 1.

Figure 6:
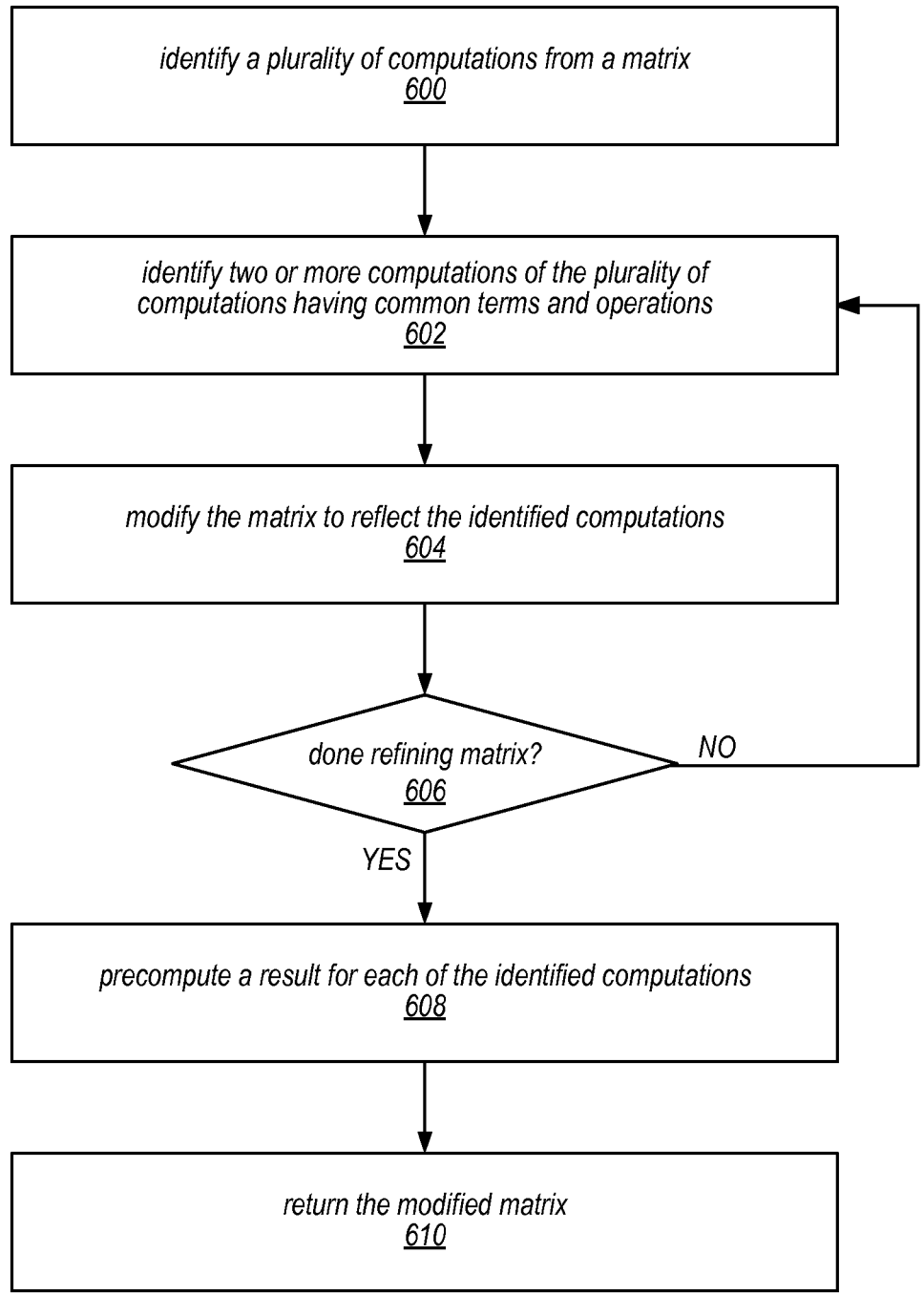
FIG. 6 is a flow diagram illustrating one embodiment of a method for refining a matrix for encoding or decoding a data object in a storage service.

As illustrated at 402, in this example, the method may include determining an encoding matrix for the data object. For example, the encoding matrix may correspond to the coding matrix 202 of FIG. 2. The encoding matrix may be generated at, for example, the matrix generator 106 of FIG. 1 or FIG. 2. As illustrated at 404, in this example, the method may include performing a refinement operation on the encoding matrix. For example, as described with respect to FIGS. 1 and 2, the refinement operation may include identifying two or more computations of the encode operation having common terms and operations according to the encoding matrix and may also include precomputing one or more results for the two or more refined computations. For example, as described with reference to FIG. 2, the matrix refinement analyzer 108 parses the coding matrix 202 to identify the index values corresponding to G and H, and the precomputation module 110 generates the precomputed results 212 for the identified computations. The precomputed results 212 may correspond to a refined encoding matrix. The refinement operation is further described below with reference to FIG. 6.

Figure 4:
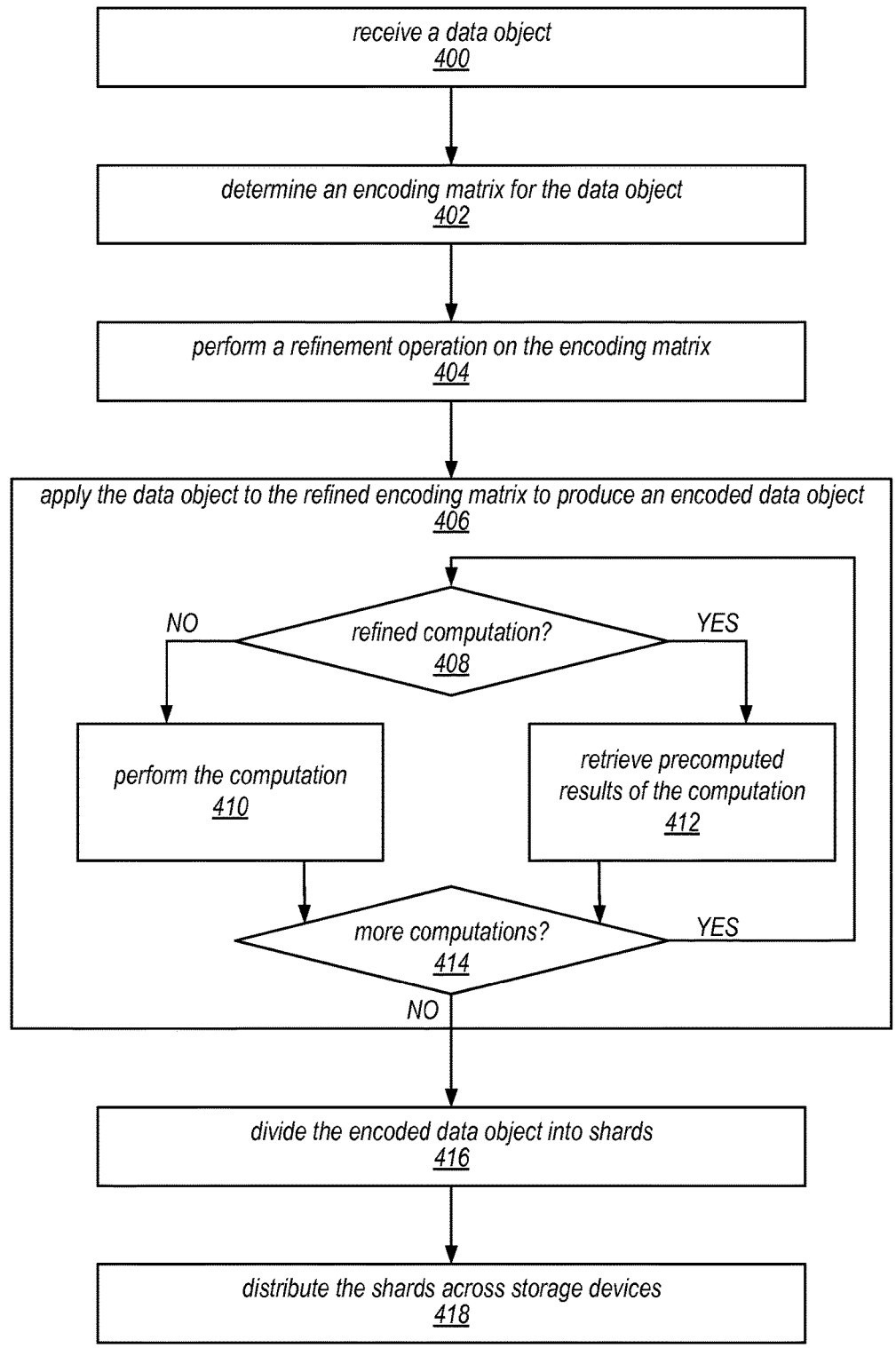
FIG. 4 is a flow diagram illustrating one embodiment of a method for encoding a data object for storage in a storage service.

As illustrated at 406, in this example, the method may include applying the data object to the refined encoding matrix to produce an encoded data object. Applying the data object to the refined encoding matrix may include an iterative process that includes 408-414, as illustrated by FIG. 4. The iterative process may include, at 408, determining whether a particular computation is a refined computation. If the particular computation is not a refined computation, the iterative process may include, at 410, performing the computation. If the particular computation is a refined computation, the iterative process may include, at 412, retrieving precomputed results of the computation instead of performing the computation. The iterative process may include, at 414, determining whether additional computations need to be performed to produce the encoded data object. If additional computations need to be performed after the particular computation, then an additional computation is considered, at 408. Otherwise, the encoded data object may be produced. As an illustrative example, the iterative process may consider the precomputed list 214 of FIG. 2. In the precomputed list, all of the computations of row A may correspond to refined computations. Thus, in response to detecting that all of the computations of row A correspond to refined computations, the method may include retrieving a precomputed result of the computations of row A, a logical "0." Additionally, the iterative process may consider row B. In row B, a portion of the computations may correspond to refined computations. Accordingly, precomputed results of the refined computations may be retrieved. However, a portion of the computations of row B do not correspond to refined computations. Accordingly, the precomputed results of row B may be combined with the additional data (e.g., a value of the data object 204 corresponding to index value 1) to generate the output data corresponding to row B, a logical "1." Further, the iterative process may consider row D. In row D, in this illustrative embodiment, none of the computations correspond to refined computations. Accordingly, all computations associated with row D may be performed to generate the output data corresponding to row D, a logical "1." When all of the computations have been considered (e.g., the computations have been performed or corresponding precomputed results have been retrieved), an encoded data object may be produced.

As illustrated at 416, in this example, the method may include dividing the encoded data object into shards. For example, the data object may correspond to the resulting object data 216 of FIG. 2. In the example, each row of the resulting object data 216 may be divided into a different shard. Although the shards described herein correspond to single bits of data, in other embodiments, shards may include more data (e.g., the object data 204 may correspond to a six-bit shard received from the storage system 102). As illustrated at 418, the method may include distributing the shards across a plurality of storage devices. For example, each shard may be provided to a different respective data storage device of the storage system 102 of FIG. 1. Thus, the method of FIG. 4 may enable encoded storage of a received data object in a distributed storage system.

As described above, in one example of a storage service, a client may request a data object from storage in a storage system that includes a plurality of data storage devices. A storage manager may retrieve the data object from storage. The data object may be decoded prior to being provided to the client. The decoding process may be refined according to a refinement process. One embodiment of a method for retrieving and decoding a data object that has been stored by a storage service is illustrated by the flow diagram of FIG. 5. As illustrated at 500, in this example, the method may include a storage service receiving a request for a data object. In some embodiments, the request may be received at a storage manager such as the storage manager 116 illustrated in FIG. 1.

As illustrated at 502, in this example, the method may include retrieving shards of an encoded data object. The encoded data object may be an encoded version of the data object. For example, the shard retrieval module 104 of FIG. 1 may retrieve a plurality of shards from the storage system 102. As illustrated at 504, in this example, the method may include determining a decoding matrix for the encoded data object. For example, the decoding matrix may correspond to the coding matrix 202 of FIG. 2. The decoding matrix may be generated at, for example, the matrix generator 106 of FIG. 1 or FIG. 2. As illustrated at 506, in this example, the method may include performing a refinement operation on the decoding matrix. For example, as described with respect to FIGS. 1 and 2, the refinement operation may include identifying two or more computations of the decode operation having common terms and operations according to the encoding matrix and may also include precomputing one or more results for the two or more refined computations. For example, as described with reference to FIG. 2, the matrix refinement analyzer 108 parses the coding matrix 202 to identify the index values corresponding to G and H, and the precomputation module 110 generates the precomputed results 212 for the identified computations. The precomputed results 212 may correspond to a refined decoding matrix. The refinement operation is further described below with reference to FIG. 6.

Figure 5:
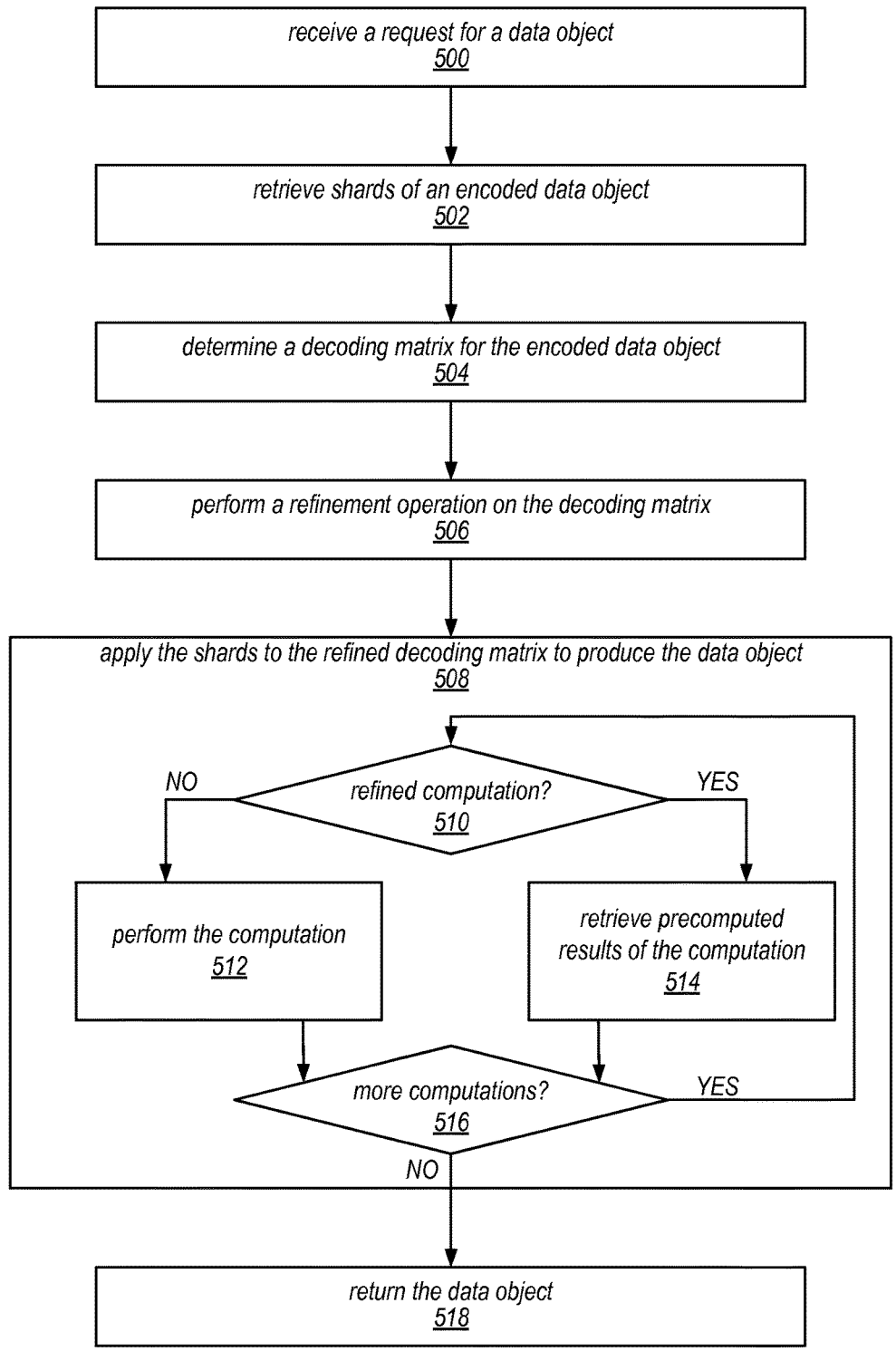
FIG. 5 is a flow diagram illustrating one embodiment of a method for retrieving and decoding a data object that has been stored by a storage service.

As illustrated at 508, in this example, the method may include applying the shards to the refined decoding matrix to produce the data object (e.g., the original, reconstructed data object). Applying the shards to the refined decoding matrix may include an iterative process that includes 510-516, as illustrated by FIG. 5. The iterative process may include, at 510, determining whether a particular computation is a refined computation. If the particular computation is not a refined computation, the iterative process may include, at 512, performing the computation. If the particular computation is a refined computation, the iterative process may include, at 514, retrieving precomputed results of the computation instead of performing the computation. The iterative process may include, at 516, determining whether additional computations need to be performed to produce the data object. If additional computations need to be performed after the particular computation, then an additional computation is considered, at 510. Otherwise, the data object may be produced. As an illustrative example, the iterative process may consider the precomputed list 214 of FIG. 2. In the precomputed list, all of the computations of row A may correspond to refined computations. Thus, in response to detecting that all of the computations of row A correspond to refined computations, the method may include retrieving a precomputed result of the computations of row A, a logical "0." Additionally, the iterative process may consider row B. In row B, a portion of the computations may correspond to refined computations. Accordingly, precomputed results of the refined computations may be retrieved. However, a portion of the computations of row B do not correspond to refined computations. Accordingly, the precomputed results of row B may be combined with the additional data (e.g., a value of the data object 204 corresponding to index value 1) to generate the output data corresponding to row B, a logical "1." Further, the iterative process may consider row D. In row D, in this illustrative embodiment, none of the computations correspond to refined computations. Accordingly, all computations associated with row D may be performed to generate the output data corresponding to row D, a logical "1." When all of the computations have been considered (e.g., the computations have been performed or corresponding precomputed results have been retrieved), a data object may be produced.

As illustrated at 518, in this example, the method may include returning the data object. For example, the data object may be returned to a client who provided the request for the data object at 500. Thus, the method of FIG. 5 may enable retrieving and decoding a data object that has been stored by a storage service.

As described above, in one example of a storage service, an encoding process and/or a decoding process may be refined according to a refinement process. One embodiment of a method for refining a matrix for encoding or decoding a data object in a storage service is illustrated by the flow diagram of FIG. 6. As illustrated at 600, in this example, the method may include identifying a plurality of computations from a matrix. In some embodiments, identifying the plurality of computations may include generating the list of indices 206 of FIG. 2 based on a coding matrix (e.g., an encoding matrix or a decoding matrix). In other embodiments, identifying the plurality of computations may include parsing a coding matrix.

As illustrated at 602, in this example, the method may include identifying two or more computations of the plurality of computations having common terms and operations. For example, the matrix refinement analyzer of FIGS. 1 and 2 may identify the computations corresponding to the index value G of FIG. 2. As another example, the matrix refinement analyzer of FIG. 1 may parse a coding matrix (e.g., an encoding matrix or a decoding matrix) and identify a plurality of computations having common terms and operations without generating a list of indices. As illustrated at 604, in this example, the method may include modifying the matrix to reflect the identified computations. For example, the matrix refinement analyzer may modify the list of indices 206 to generate the refined list of indices 208 which reflects the identified computations corresponding to index G. As illustrated at 606, in this example, the method may include determining whether the system is done refining the matrix. For example, as described with reference to FIG. 1, the system may be done refining the matrix after identifying a specified number of computations or after a particular duration has expired. If the system is not done refining the matrix, the method may return to 602 to identify a new set of two or more computations of the plurality of computations having common terms and operations. If the system is done refining the matrix, the method may proceed to 608.

As illustrated at 608, in this example, the method may include precomputing a result for each of the identified computations. For example, the precomputation module 110 of FIGS. 1 and 2 may determine the precomputed results 212 for the identified computations corresponding to the index values G and H. As illustrated at 610, in this example, the method may include returning the modified matrix. For example, after the precomputed results 212 have been determined, the method may include returning a modified matrix (e.g., corresponding to the precomputed list 214). In some embodiments, the modified matrix may be provided to the data object coding module 112 of FIGS. 1 and 2. Thus, the method of FIG. 6 may enable refining a matrix for encoding or decoding a data object in a storage service.

Figure 7:
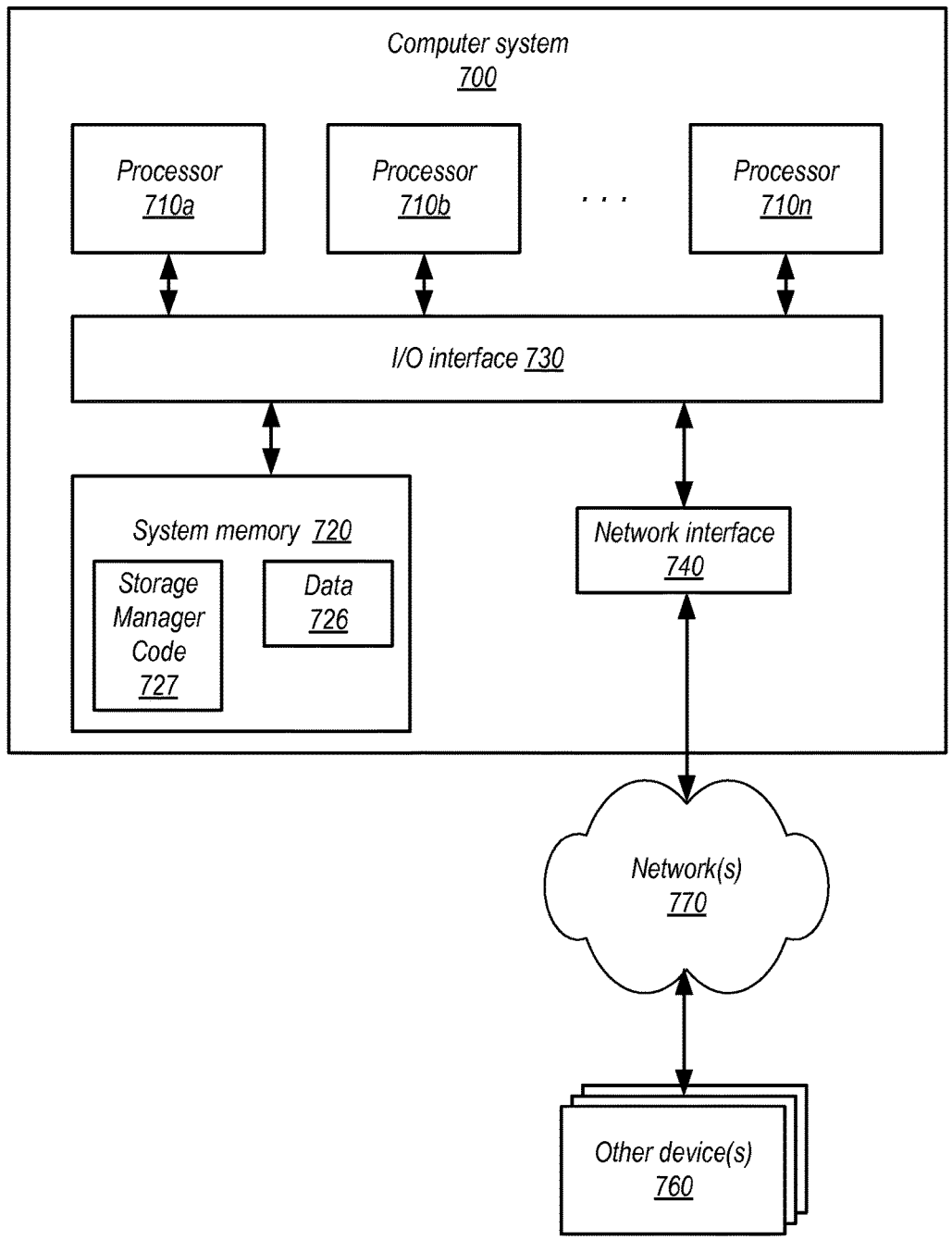
FIG. 7 is a block diagram illustrating one embodiment of a computer system configured to implement at least a portion of a storage manager, as described herein.

One embodiment of a computer system configured to implement at least a portion of a storage manager such as the storage manager 116 of FIG. 1 is shown in FIG. 7. In at least some embodiments, a server that implements a portion or all of the methods and apparatus for computation refinement in object-redundant storage systems as described herein may include a general-purpose computer system that includes or is configured to access one or more computer-accessible media, such as a computer system 700 illustrated in FIG. 7. In the illustrated embodiment, the computer system 700 includes one or more processors 710*a-n* coupled to a system memory 720 via an input/output (I/O) interface 730. The computer system 700 further includes a network interface 740 coupled to the I/O interface 730.

In various embodiments, the computer system 700 may be a uniprocessor system including one processor 710*a*, or a multiprocessor system including several processors 710*a-n* (e.g., two, four, eight, or another suitable number). The processors 710*a-n* may be any suitable processors capable of executing instructions. For example, in various embodiments, the processors 710*a-n* may be general-purpose or embedded processors implementing any of a variety of instruction set architectures (ISAs), such as the x86, PowerPC, SPARC, or MIPS ISAs, or any other suitable ISA. In multiprocessor systems, each of the processors 710*a-n* may commonly, but not necessarily, implement the same ISA.

System memory 720 may be configured to store instructions and data accessible by the processor(s) 710. In various embodiments, the system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for computation refinement in object-redundant storage systems, are shown stored within the system memory 720 as storage manager code 727 and data 726.

In one embodiment, the I/O interface 730 may be configured to coordinate I/O traffic between a processor 710, the system memory 720, and any peripheral devices in the device, including the network interface 740 or other peripheral interfaces. In some embodiments, the I/O interface 730 may perform any necessary protocol, timing or other data transformations to convert data signals from one component (e.g., the system memory 720) into a format suitable for use by another component (e.g., a processor 710). In some embodiments, the I/O interface 730 may include support for devices attached through various types of peripheral buses, such as a variant of the Peripheral Component Interconnect (PCI) bus standard or the Universal Serial Bus (USB) standard, for example. In some embodiments, the function of the I/O interface 730 may be split into two or more separate components, such as a north bridge and a south bridge, for example. Also, in some embodiments some or all of the functionality of the I/O interface 730, such as an interface to the system memory 720, may be incorporated directly into a processor 710.

The network interface 740 may be configured to allow data to be exchanged between the computer system 700 and other devices 760 attached to a network or networks 770, such as other computer systems or devices as illustrated or described in FIGS. 1 through 6, for example. In various embodiments, the network interface 740 may support communication via any suitable wired or wireless general data networks, such as types of Ethernet network, for example. Additionally, the network interface 740 may support communication via telecommunications/telephony networks such as analog voice networks or digital fiber communications networks, via storage area networks such as Fibre Channel SANs, or via any other suitable type of network and/or protocol.

In some embodiments, the system memory 720 may be one embodiment of a computer-accessible medium configured to store program instructions and data as described above for FIGS. 1 through 6 for implementing embodiments of computation refinement when encoding or decoding data objects in storage systems (e.g., distributed storage systems). However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to the computer system 700 via the I/O interface 730. A non-transitory computer-accessible storage medium may also include any volatile or non-volatile media such as RAM (e.g. SDRAM, DDR SDRAM, RDRAM, SRAM, etc.), ROM, etc., that may be included in some embodiments of the computer system 700 as the system memory 720 or another type of memory. Further, a computer-accessible medium may include transmission media or signals such as electrical, electromagnetic, or digital signals, conveyed via a communication medium such as a network and/or a wireless link, such as may be implemented via the network interface 740.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
    a storage system comprising a plurality of storage devices, wherein the storage system is configured to store a plurality of data objects according to an erasure coding technique, wherein each respective data object of the plurality of data objects is stored as a respective plurality of shards such that the respective data object can be reconstructed from a particular number of shards that is fewer than a total number of shards for that data object, wherein each shard for the respective data object is stored on a different one of the plurality of storage devices than any other shard of the plurality of shards for the respective data object; and
    a storage manager implemented by one or more hardware processors and configured to receive a plurality of requests from one or more clients for respective data objects of the plurality of data objects, wherein in response to each individual request of the plurality of requests the storage manager is configured to:
        retrieve, while the storage devices storing the plurality of shards for the requested data object are each operational, a subset of the plurality of shards for the requested data object from the storage system, wherein the subset includes at least the particular number of shards;
        determine a decoding matrix for the requested data object, wherein the decoding matrix specifies a plurality of computations for reconstructing the data object from the subset of the plurality of shards;
        perform a refinement operation on the decoding matrix, wherein to perform the refinement operation the storage manager is further configured to identify two or more computations of the plurality of computations having common terms and operations according to the decoding matrix, and to precompute one or more results for the two or more identified computations;
        perform computations according to the decoding matrix to reconstruct the requested data object from the subset, wherein the storage manager is further configured to use the one or more precomputed results instead of performing the identified computations while reconstructing the requested data object; and
        return the reconstructed data object to the client.

2. The system of claim 1, wherein, to identify the two or more computations having common terms and operations according to the decoding matrix, the storage manager is further configured to:
    generate a list of indices based on the decoding matrix, wherein each row of the list of indices corresponds to a row of the decoding matrix and comprises one or more index values indicating which data terms from the subset of shards are specified by the row of the decoding matrix for computation to reconstruct the requested data object; and
    parse the list of indices to identify one or more sets of indices having index values that are repeated in different rows of the list of indices.

3. The system of claim 2, wherein, to perform the refinement operation, the storage manager is further configured to replace a particular set of indices in the list of indices with a new index representative of a particular corresponding computation to be precomputed.

4. The system of claim 1, wherein the storage system and storage manager are part of a network-based storage service, wherein respective data objects of the plurality of data objects are stored on behalf of a plurality of different clients according to a network-based interface of the network-based storage service, and wherein at least some of the storage devices store shards for multiple different clients of the plurality of different clients.

5. The system of claim 1, wherein, to determine the decoding matrix of the subset, the storage manager is further configured to:
    retrieve a stored erasure coding matrix corresponding to the data object; and
    generate the decoding matrix from the erasure coding matrix according to which shards of the plurality of shards form the subset, wherein each shard of the plurality of shards corresponds to a respective portion of the stored erasure coding matrix, wherein the decoding matrix is generated from respective portions of the stored erasure coding matrix.

6. A method, comprising:
    performing, by one or more computers:
        receiving a plurality of requests from one or more clients, wherein each request comprises instructions for a respective data object; and
        in response to receiving each individual request of the plurality of requests:
            retrieving a subset of a plurality of shards for an encoded data object, wherein the data object requested from the respective client is stored as the encoded data object comprising at least the plurality of shards such that the data object can be reconstructed from a particular number of shards that is fewer than a total number of shards of the plurality of shards, wherein each shard of the plurality of shards is stored on a different one of a plurality of operational storage devices than any other shard of the plurality of shards;
            determining a decoding matrix for the encoded data object, wherein the decoding matrix specifies a plurality of computations for reconstructing the data object from at least the subset of the plurality of shards;

performing, on the decoding matrix, a refinement operation comprising identifying two or more computations of the plurality of computations having common terms and operations according to the decoding matrix, and precomputing one or more results for the two or more identified computations;

perform computations according to the decoding matrix to reconstruct the data object from at least the subset of the plurality of shards, wherein the one or more precomputed results are used instead of performing the identified computations while generating the decoded data object; and returning, to the respective client, the data object reconstructed from the at least the subset of the plurality of shards.

7. The method of claim 6, further comprising: retrieving each shard from a respective storage device of the plurality of storage devices, wherein at least some of the plurality of storage devices store different shards for other data objects.

8. The method of claim 6,
wherein retrieving a subset of a plurality of shards further comprises waiting until a minimum number of shards needed to reconstruct the data object have been received.

9. The method of claim 6, wherein performing, on the decoding matrix, a refinement operation comprising identifying two or more computations of the plurality of computations further comprises:
generating a list of indices based on the decoding matrix, wherein each row of the list of indices corresponds to a row of the decoding matrix and comprises one or more index values indicating which data terms from the at least a subset of the plurality of shards are specified by the row of the decoding matrix for computation to reconstruct the requested data object; and
iteratively parsing the list of indices to identify one or more sets of indices having index values that are repeated in different rows of the list of indices.

10. The method of claim 6, wherein determining the decoding matrix further comprises determining the decoding matrix according to which shards of the plurality of shards form the subset.

11. The method of claim 6,
wherein determining the decoding matrix further comprises rejecting, based at least on a sufficient number of shards in a subset being available, one or more of the plurality of shards from being included in the at least the subset of the plurality of shards.

12. A non-transitory, computer-readable storage medium storing program instructions that when executed on one or more computers cause the one or more computers to:
implement a data decoding system configured to, in response to each individual request of a plurality of requests from one or more client computers for respective data objects:
retrieve a subset of a plurality of shards for an encoded data object, wherein the data object requested from the client computer is stored as the encoded data object comprising at least the plurality of shards, wherein each shard of the plurality of shards is stored on a different one of a plurality of operational storage devices than any other shard of the plurality of shards;

determine a decoding matrix for the encoded data object, wherein the decoding matrix specifies a plurality of computations for reconstructing a data object from at least the subset of the plurality of shards;

perform a refinement operation on the decoding matrix, comprising identifying two or more computations of the plurality of computations having common terms and operations according to the decoding matrix, and precomputing one or more results for the two or more identified computations;

perform computations according to the decoding matrix to reconstruct the data object from the at least a subset of the plurality of shards, wherein the data decoding system is configured to use the one or more precomputed results instead of performing the two or more identified computations; and return, to the client computer, the data object reconstructed from the at least the subset of the plurality of shards.

13. The non-transitory, computer-readable storage medium of claim 12, wherein, to determine the decoding matrix, the data decoding system is further configured to reject, based at least on a sufficient number of shards in a subset being available, one or more of the plurality of shards from being included in the at least the subset of the plurality of shards.

14. The non-transitory, computer-readable storage medium of claim 12, wherein, to receive the plurality of shards, the data decoding system is further configured to wait until a minimum number of shards needed to reconstruct the data object have been received.

15. The non-transitory, computer-readable storage medium of claim 12, wherein, to identify the two or more computations, the data decoding system is configured to:
generate a list of indices based on the decoding matrix, wherein each row of the list of indices corresponds to a row of the decoding matrix and comprises one or more index values indicating which data terms from the at least a subset of the plurality of shards are specified by the row of the decoding matrix for computation to reconstruct the requested data object; and
iteratively parse the list of indices to identify one or more sets of indices having index values that are repeated in different rows of the list of indices.

16. The non-transitory, computer-readable storage medium of claim 15, wherein, to iteratively parse the list of indices, the data decoding system is configured, during a particular iteration, to:
identify a particular set of indices having index values that are repeated in different rows of the list of indices;
replace each occurrence of the repeated index values of the particular set of indices with a respective new index value; and
generate a new row in the list of indices that indicates that each new index value represents the repeated index values of the particular set of indices.

17. The non-transitory, computer-readable storage medium of claim 16, wherein, to iteratively parse the list of indices, the data decoding system is configured, during a subsequent iteration, to:
identify a different set of indices having index values that are repeated in different rows of the list of indices, wherein the index values that are repeated in the different set of indices include the new index value and at least one other index value;

replace each occurrence of the repeated index values of the different set of indices with a respective different new index value; and generate a different new row in the list of indices that indicates that each different new index value represents the repeated index values of the different set of indices.

18. The non-transitory, computer-readable storage medium of claim 12, wherein, to identify the two or more computations, the data decoding system is configured to continue to attempt to identify, according to a greedy algorithm on the decoding matrix, computations having common terms and operations as specified in the decoding matrix until a specified number of computations have been identified.

19. The non-transitory, computer-readable storage medium of claim 12, wherein, to identify the two or more computations, the data decoding system is configured to continue to attempt to identify, according to a greedy algorithm on the decoding matrix, computations having common terms and operations as specified in the decoding matrix until a predetermined threshold has been reached, and wherein the predetermined threshold includes: until a predetermined amount of time expires, until a specified number of computations has been identified, until all computations having at least a particular complexity are identified, until a minimum number of terms in common for each identified computation is reached, until a number of common terms based on matrix size is reached, or until a predicted number of optimal computations is reached.

20. The non-transitory, computer-readable storage medium of claim 12, wherein the data decoding system is further configured to receive a complexity indicator that specifies a minimum number of terms, and, to perform the refinement operation, the data decoding system is further configured to identify only computations having at least the minimum number of terms in common.

21. The non-transitory, computer-readable storage medium of claim 12, wherein the encoded data object is stored as at least one other shard that is not included in the plurality of shards, and wherein the encoded data object is stored according to an erasure coding technique.

22. The non-transitory, computer-readable storage medium of claim 12, wherein each computation of the two or more identified computations includes one or more exclusive or (XOR) operations, and wherein precomputing the one or more results for the two or more identified computations comprises performing the one or more XOR operations.

* * * * *